United States Patent
Erhart et al.

(10) Patent No.: US 10,198,760 B2
(45) Date of Patent: Feb. 5, 2019

(54) KIOSK ESCALATION

(71) Applicant: Avaya, Inc., Basking Ridge, NJ (US)

(72) Inventors: George Erhart, Loveland, CO (US); Valentine C. Matula, Granville, OH (US); David Skiba, Golden, CO (US)

(73) Assignee: Avaya Inc., Basking Ridge, NJ (US)

( * ) Notice: Subject to any disclaimer, the term of this patent is extended or adjusted under 35 U.S.C. 154(b) by 842 days.

(21) Appl. No.: 14/254,548

(22) Filed: Apr. 16, 2014

(65) Prior Publication Data

US 2015/0302499 A1     Oct. 22, 2015

(51) Int. Cl.
| | |
|---|---|
| G06Q 30/00 | (2012.01) |
| G06F 17/30 | (2006.01) |
| G06Q 30/06 | (2012.01) |
| G06Q 20/18 | (2012.01) |

(52) U.S. Cl.
CPC ......... *G06Q 30/0613* (2013.01); *G06Q 20/18* (2013.01)

(58) Field of Classification Search
CPC .................................................. G06Q 30/0613
See application file for complete search history.

(56) References Cited

U.S. PATENT DOCUMENTS

| | | | |
|---|---|---|---|
| 7,936,863 B2 | 5/2011 | John et al. | |
| 2008/0120381 A1 | 5/2008 | Awan et al. | |
| 2013/0030915 A1* | 1/2013 | Statler | G06Q 30/06 705/14.54 |
| 2015/0170239 A1* | 6/2015 | Hamilton | G06Q 30/0613 705/26.41 |

OTHER PUBLICATIONS

Klie, L. (2007). Bridging the gap. Speech Technology, 12(8), 14-17, 19. Retrieved from https://search.proquest.com/docview/212188889?accountid=14753.*
U.S. Appl. No. 13/926,879 entitled "Mobile Monitoring for Supervisors" filed Jun. 25, 2013; Thomson et al.

* cited by examiner

*Primary Examiner* — Kathleen Palavecino
(74) *Attorney, Agent, or Firm* — Sheridan Ross P.C.

(57) ABSTRACT

Automated kiosks are often provided in retail settings to provide a convenient and cost-effective means to assist customers of the retail setting and as an alternative or supplement to human agents. Kiosks may work well for certain customers and actions, however, the customer and/or kiosk may fail to effectively interact with each other and leave the customer dissatisfied with the interaction. By determining a meta-meaning associated with a customer's actions with a kiosk, the kiosk may be able to determine whether an agent should be summoned to assist the customer. For example, a customer may be using the kiosk for an unusually long time. In response, an available agent may be notified and approach the customer to offer their assistance; without the customer explicitly requesting such assistance. As a benefit, the retail setting may appear more in-touch with the needs of the customer.

20 Claims, 4 Drawing Sheets

KIOSK ESCALATION

FIELD OF THE DISCLOSURE

The present disclosure is generally directed toward kiosks, such as in a retail setting, and the operation thereof.

BACKGROUND

Prompt customer service is important for retail businesses. Retail businesses can create customer loyalty and promote good word of mouth advertising and endorsements by providing prompt customer service. Excellent communication is critical to providing the right level of customer service at the right time, especially if a customer is confused or upset.

In many retail settings today, interactive kiosks are used as a self-help resource. Customers can look up data and details, inventory availability, make purchases, and a kiosk can provide additional services that do not require a person. Unfortunately, a kiosk service does not always help a customer. The customer may run into trouble or run out of options without getting the service he or she needs. If a clerk or agent isn't right there to help, the customer may just leave. Voice and/or video assistance, if available, may not always be enough to help the customer complete his or her task.

SUMMARY

It is with respect to the above issues and other problems that the embodiments presented herein were contemplated.

Retail settings may provide an additional level of customer support by providing a mechanism to determine when an escalation from a kiosk to a person is needed and the ability to provide additional browsing and/or input data so that an agent can efficiently meet the needs of the customer. The need may be based on various factors, such as, a customer request, a response to a customer action, or an indication that a transaction is high-value and a personal touch desired.

In one embodiment, kiosk escalation is provided based on making determinations regarding when and how to escalate to another form of conversation. Parameters can be set to trigger a service level change from a customer who is interacting with a kiosk to sending an agent to actively assist the customer. The parameters may be set for when to provide the agent, and another algorithm may also be triggered to determine which agent or agents are available and alert them to respond to the customer. Matching and balancing of the concepts of when to escalate, who can respond to the escalation, and how notification is provided to the customer are also provided.

The kiosk, or computer associated with the kiosk, may be programmed with the set of rules that dictate when an escalation should occur. The escalation may then be paired with people and items. For example, if stock is required, the agent may be notified to pull the item from inventory before going to the customer, such as when a customer indicates, "I need this in red but nothing is out here right now." Notification of the escalation may be sent to the kiosk, the available agent or agents, and/or to the customer requiring assistance. The kiosk escalation mechanism may additionally detect completion of the escalated task based on sensors, such as via RFID devices, inputs to the kiosk, and/or employee position/motion sensors.

An additional embodiment provides a pop-up message for the customer at the kiosk, such as to give the customer the option to have the information pushed from the kiosk to a mobile device and/or initiate a call to an agent.

In another embodiment, an agent and a customer meeting location options may be provided, such as, having the agent come to the kiosk and/or the agent and customer meeting at a specific location. In yet another embodiment, photos of the customer and/or agent may be taken and exchanged with each other so that each can more readily identify the other.

In one embodiment, a method is disclosed, comprising: operating a kiosk; receiving, by a microprocessor of the kiosk, a first customer action from a customer, the first customer action being associated with a first primary meaning determined by the customer and absent a request for agent assistance; determining a first primary response to the first primary meaning; performing the first primary response; analyzing, by the microprocessor, a set of rules associating the first customer action with a meta-meaning; determining, by the microprocessor, a first secondary response based on the meta-meaning; upon determining the first secondary response is to provide agent assistance to the customer, selecting an agent from a set of agents to assist the customer; and signaling the selected agent to assist the customer.

In another embodiment, a system is disclosed, comprising: a kiosk, further comprising, a display, an input, and an output; and a processor, operable to: receive a first customer action from a customer, the first customer action being associated with a first primary meaning determined by the customer and absent a request for agent assistance; determine a first primary response to the first primary meaning; perform the first primary response; analyze a set of rules associating the first customer action with a meta-meaning; determine a first secondary response based on the meta-meaning; upon determining the first secondary response is to provide agent assistance to the customer, select an agent from a set of agents to assist the customer; and signal the selected agent to assist the customer.

In another embodiment, a non-transitory computer readable medium is disclosed with instructions thereon that, when read by a computer, cause the computer to perform: operating a kiosk; receiving, by a microprocessor of the kiosk, a first customer action from a customer, the first customer action being associated with a first primary meaning determined by the customer and absent a request for agent assistance; determining a first primary response to the first primary meaning; performing the first primary response; analyzing, by the microprocessor, a set of rules associating the first customer action with a meta-meaning; determining, by the microprocessor, a first secondary response based on the meta-meaning; upon determining the first secondary response is to provide agent assistance to the customer, selecting an agent from a set of agents to assist the customer; and signaling the selected agent to assist the customer.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that other aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

The identification in the description of element numbers without a subelement identifier, when a subelement identifiers exist in the figures, when used in the plural, is intended to reference any two or more elements with a like element number. A similar usage in the singular, is intended to reference any one of the elements with the like element number. Any explicit usage to the contrary or further qualification shall take precedent.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, and are well known, or are otherwise summarized.

For meanings of explanation, numerous details are set forth in order to provide a thorough understanding of the present disclosure. It should be appreciated, however, that the present disclosure may be practiced in a variety of ways beyond the specific details set forth herein.

Figure 1:
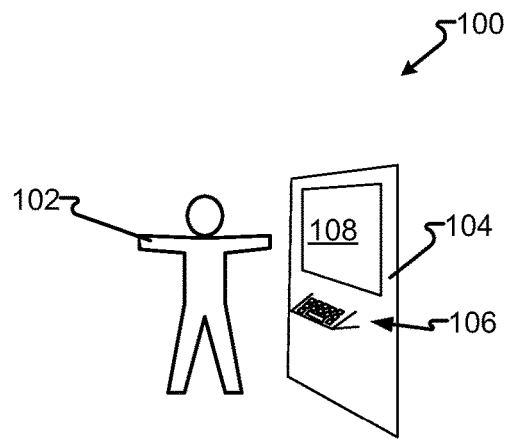
FIG. 1 depicts a customer-kiosk interaction in accordance with embodiments of the present disclosure.

With reference now to FIG. 1, diagram 100 will be described for customer interaction with a kiosk in accordance with embodiments of the present disclosure. In one embodiment, customer 102 interacts with kiosk 104. The interactions between customer 102 and kiosk 104 may include keyboard 106 and display 108. Additional/alternative input/output devices may be incorporated into kiosk 104, such as, the incorporation of a touch screen, and thereby the incorporation of keyboard 106, into display 108. Similarly, speakers, microphones, cameras, mice, trackballs, touchpad, card reader, optical code reader, radio frequency reader, or other input/output devices may be utilized to facilitate interactions between customer 102 and kiosk 104 to facilitate customer 102 interacting with kiosk 104 in text, speech, gesture, and/or machine-readable modes.

In another embodiment, kiosk 104 is located within a retail setting offering goods and/or services for purchase by customer 102. Kiosk 104 may be configured to offer assistance, such as a virtual customer service desk, and/or a point-of-sale terminal whereby customer 102 may purchase one or more of the aforementioned goods or services. Customer 102, using kiosk 104, may locate items of interest within the retail setting, get suggestions for items for purchase, perform account actions, or similar activity associated with customer 102 and a retail setting.

A processor associated with kiosk 104 receives customer actions from customer 102. Kiosk 104 may incorporate systems known in the prior art to respond to a customer action, such as by showing the location of the shoe department when customer 102 attempts to locate the shoe department or by displaying an account balance upon receiving account credentials (e.g., password, account number, username, etc.) from customer 102.

In another embodiment, the processor associated with kiosk 104 monitors customer actions for a secondary meaning, hereinafter, a "meta-meaning" The meta-meaning may be associated with a purpose warranting a response by an agent of the retail setting without customer 102 requesting an agent. The meta-meaning being associated with a customer service event whereby an agent, if available, may be dispatched to customer 102 and interact with customer 102 to resolve an issue or provide an enhanced customer service experience (e.g., a "personal touch"). For example, customer 102 may utilize kiosk 104 to perform an action, such as to locate an item for purchase. Kiosk 104 displays the response to the search. If after a number of attempts, which may be successful or unsuccessful, kiosk 104 continues to respond to customer 102. However, if the number of search attempts is above a previously determined threshold, a meta-meaning may be determined (e.g., customer 102 is having difficulty locating an item and/or customer 102 is trying to locate many items). If the meta-meaning is associated with an action, such as to summon an agent to assist the customers, an available agent may be selected and notified to assist customer 102.

In another embodiment, kiosk 104 may be installed as a stand-alone device. However, in other embodiments, kiosk 104 is connected to other systems and devices via one or more networks (e.g., WiFi, Bluetooth, cellular network, Ethernet, etc.). Accordingly, kiosk 102 may communicate with other systems and components, which may further include, devices associated with customer 102.

Figure 2:
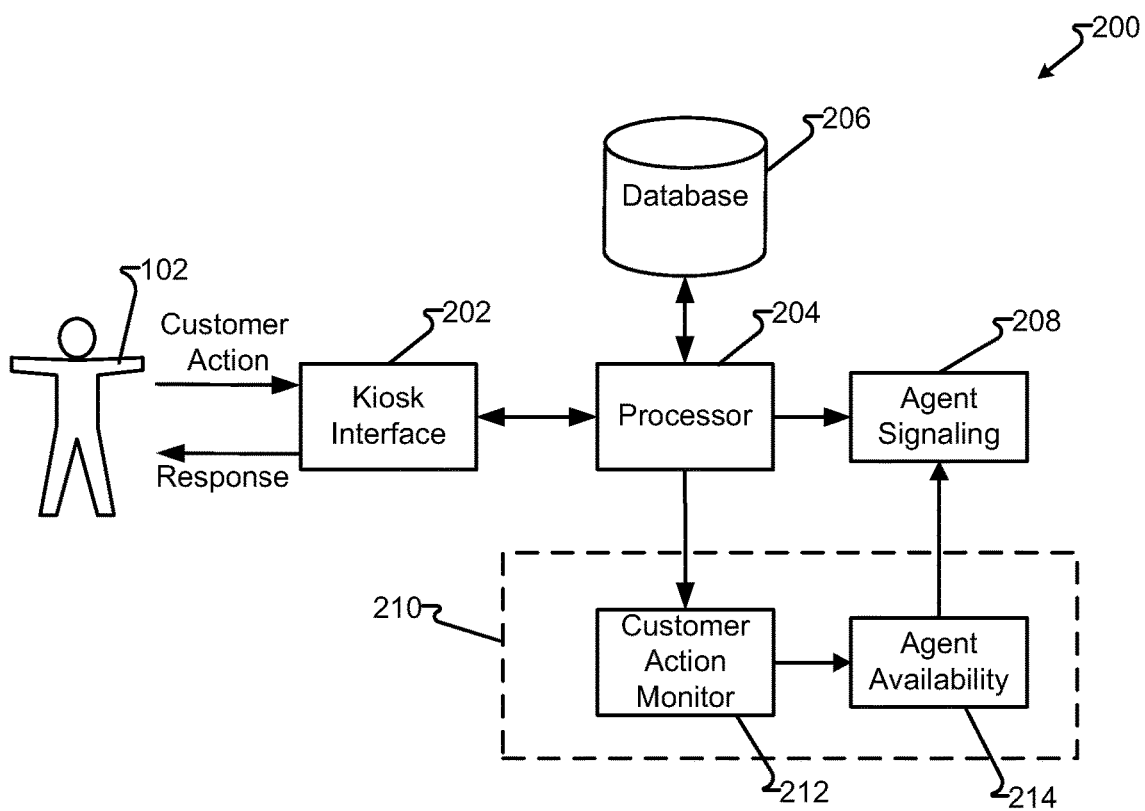
FIG. 2 depicts a diagram including components of a kiosk in accordance with embodiments of the present disclosure.

With reference now to FIG. 2, system diagram 200 including components of kiosk 104 will be described for processing a meta-meaning associated with customer actions of customer 102 in accordance with embodiments of the present disclosure. In one embodiment, customer 102 interacts with kiosk 104 and various components thereof. Kiosk interface 202, such as keyboard 106 or other input component to receive a customer action and present a response to the customer action. Kiosk interface 202 utilizes processor 204 which, as needed, interacts with database 206. Database 206 may contain product information, product location, maps, advertisements, associations between products, account information, and/or other data operable enable processor 204 to respond to the customer action of the customer action. Database 206 may be embodied as a database or other data source (e.g., cloud service, location systems, translation services, Internet, Intranet, etc.)

Processor 204 then formulates a response and provides the response to kiosk interface 202 for delivery to customer 102 and thereby responding to the customer action of the customer interface. As is known in the prior art, kiosk interface 202 may receive a customer action that is an explicit request for help from an agent, which may be known as a sales clerk, sales associate, customer service agent, etc. In response, processor 204 causes agent signaling 208, such as via automated paging system, instant message to a device associated with an agent, or other communication means, summons an agent. In contrast, the embodiments herein are directed towards customer actions that are not requests for assistance but rather for the performance of other actions. These other actions may then be detected by monitoring subsystem 210 and determine that an agent should be summoned.

In one embodiment, monitoring subsystem 210 monitors one or more components of kiosk 104, such as processor 204. In another embodiment, monitoring subsystem is executed as a part of processor 204, such as an integrated or separate one or more process or thread or as at least one process on a different processor. Monitoring subsystem may include components, such as, customer action monitor 212 and agent availability 214.

Customer action monitor 212 receives customer actions. If one or more customer actions, includes a meta-meaning associated with an agent action, agent availability 214 may select an available agent and summon then accordingly. If no agent is available, agent availability 214 may wait until an agent becomes available or discard the request for an agent, such as if customer 102 has left kiosk 104. The specific meta-meanings that do, or do not, cause an agent to be summoned may be a matter of design choice. For example, one retail setting may seek to have agents help customers sooner than another retail setting. As a result, one retailer may summon an agent upon detecting one customer performed five searches and another retailer will not summon an agent until a customer performs twenty searches. In addition to a number of searches, other aspects may be utilized to different degrees depending on objectives and operations of the retailer, such as the number of failed/successful searches, items returned in a search, aspects of particular items searched for, specific account actions, or other operations. In addition, a specific customer or customer attribute may be determined and factored into a meta-meaning. For example, if customer 102 is known to be Mr. Smith who is known to have limited mobility, and Mr. Smith performs an operation on kiosk 104, an agent may be summoned more readily than if the same operation was performed by a customer was unknown or known to not have mobility limitations. Similar customer-based meta-meaning may be implemented to further customize a response threshold, such as, customer value (e.g., "platinum" level customer) or other aspect of a customer (e.g., frustrates quickly, speaks Russian, etc.).

In one embodiment, customer action monitor 212 receives a single customer action. The single customer action may be associated with an opportunity to up-sell, provide enhanced customer service, or anticipate a need. For example, if customer 102 performed a customer action associated with a high-value item or an item that requires special handling (e.g., unusually large, fragile, heavy, etc.), agent availability 214 may be notified and dispatched to assist customer 102. Furthermore, the agent may be notified of the item and/or the special handling required and, for example, meet customer 102 with a cart operable to accommodate the heavy item.

In another embodiment, customer 102 creates a number of customer actions. Customer action monitor 212 determines that the plurality of customer actions are associated with a meta-meaning and need to summon an agent. The meta-meaning may be one or more of confusion, frustration, or other pattern of events derived from the plurality of customer events. Customer 102 having such a meta-meaning may be at a high risk for leaving the retail setting unhappy and/or provide the retailer with an opportunity to build goodwill with customer 102. Accordingly, agent availability 214 is notified to dispatch an agent to assist customer 102.

The time kiosk 102 is idle, with respect to inputs from customer 102 may indicate that the next input is from the same or a different customer 102. Similarly, motion sensors, camera, pressure pads, or other equipment may be utilized to determine whether kiosk 104 is being utilized by the same customer 102 or a different customer 102. Customer actions are generally associated with a single customer, such as a single customer 102. However, by preserving a history, customer action monitor 212 may summon an agent upon a plurality of customer actions, associated with two or more customers. For example, a thunderstorm caused a plurality of customers 102 to utilize kiosk 104 to locate umbrellas. While each customer 102 may receive an individual response to their respective customer action, customer action monitor 212 may determine that an agent needs to be summoned to resolve the issue, such as to relocate the umbrellas, retrieve more umbrellas from backroom stock, may themselves more available to inform customers that the umbrellas have sold out, recommend alternative products, and/or other customer service activity.

In one embodiment, components 202, 204, 206, 208 and monitoring subsystem 210 are embodied within kiosk 104. In another embodiment, at least one of components 202, 204, 206, 208 and monitoring subsystem 210, or individual subcomponents 212, 214, are embodied external to kiosk 104 and kiosk 104 is provided with communications means to the one or more components that are externally embodied. Communications means may be provided such as to communicatively connect components located within a single retail setting, multiple retail settings, and other off-site settings, such as a contact center. For example, monitoring subsystem 210 may be located at a contact center and thereby leverage the resource of the contact center and thereby reduce the burden of on-site retailer resources.

Figure 3:
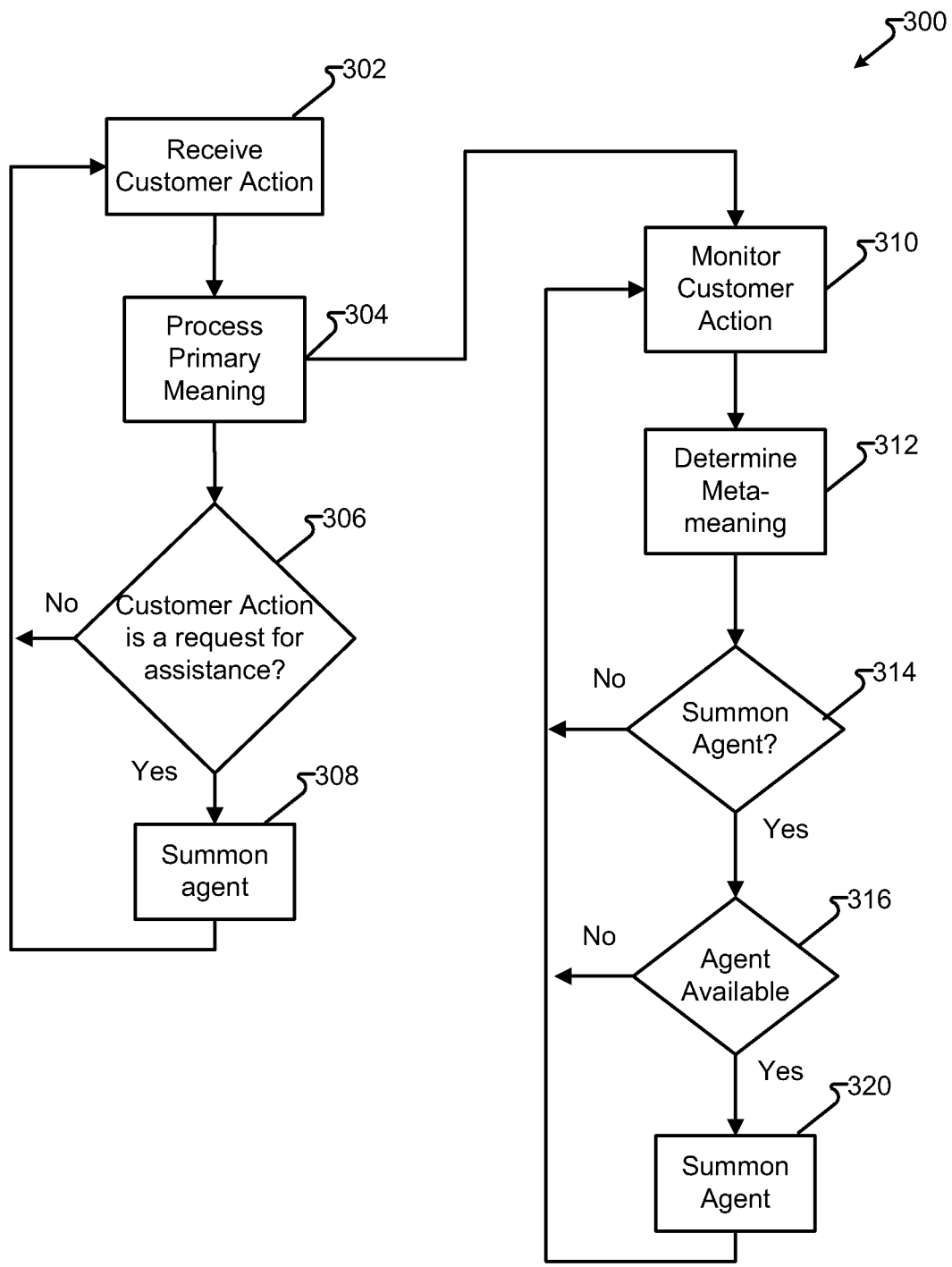
FIG. 3 depicts a process for processing a customer interaction with a kiosk in accordance with embodiments of the present disclosure.

With reference now to FIG. 3, process 300 will be described for processing a customer interaction with a kiosk in accordance with embodiments of the present disclosure. In one embodiment, steps 302, 304, 306, and 308 process the primary meaning of a customer action and if the primary meaning is a request for assistance, summons an agent to assist the customer. In one embodiment, step 302 receives a customer action. The customer action may be received, such as by customer 102 interfacing with kiosk interface 202 of kiosk 104. Step 304 processes the primary meaning of the customer action, such as to display search results, locate an item, perform an account operation, or other customer service action. Step 306 determines if the customer action is an explicit request for assistance, and, if yes, step 308 summons an agent. Processing continues at step 302.

In one embodiment, step 310 monitors the customer action and/or the processing of customer actions, such as by monitoring step 304. It should be appreciated that step 310 may be performed by other components and/or at other points in a process 300 without departing from the embodiments described herein. Similarly, step 310 may be omitted in certain embodiments whereby step 312 receives the customer actions without performing a distinct monitoring step. Step 312 determines the meta-meaning for one or more customer actions.

Step 312 may determine a meta-meaning associated with a single or plurality of customer actions. For example, a customer action, such as a search for Faberge eggs may be determined to have a meta-meaning of, "customer is interested in an expensive, fragile item." In another example, step 312 may determine a meta-meaning based on a plurality of actions. For example, step 310 may be executed multiple times, such as a search on the same or similar term. Step 312 may then determine that the customer action has a meta-meaning, such as, "customer is confused," "customer appears to not understand the operation of the kiosk," or other meta-meaning.

In another embodiment, step 310 may monitor the customer action, or number of actions, with respect to time. For example, a customer may perform a first customer action 302. However, the same customer may continue to perform customer actions beyond a threshold of time usage associated with normal operations. Step 312 may then determine that the meta-meaning indicates the customer would benefit from human assistance, even if the specific reason is undetermined and/or determined to be using the kiosk for an amount of time longer than a threshold amount.

In another embodiment, step 314 determines if the determined meta-meaning is associated with summoning an agent. If not, processing may continue at step 310. If yes, step 316 may determine if an agent is available and, if so, step 320 summons the agent. In yet another embodiment, step 320 may select one particular agent from a set of agents. The selected agent may be at a more favorable location to the customer, have knowledge important to the customer action, have authority (e.g., can approve large purchases), have access to a secondary item (e.g., dolly, pallet jack, packing material, etc.) used to support the purchase of an item indicated in the customer action, or other item. As a benefit, a customer who searches for an item requiring special attention may be met by an associate who can help them complete their purchase and/or transport their purchase, all without expressly indicating a need for human assistance.

Figure 4:
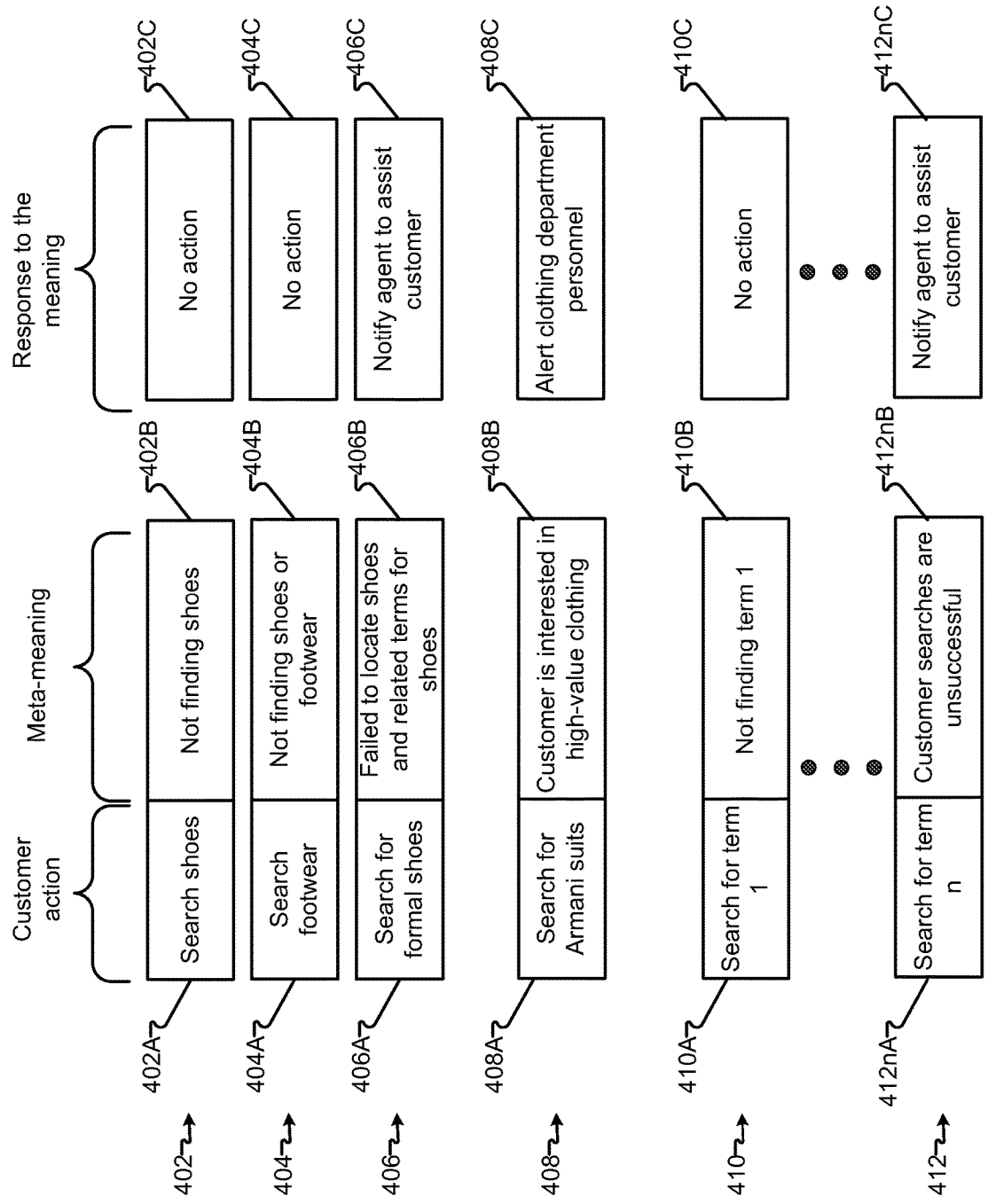
FIG. 4 depicts data structures for processing a customer interaction with a kiosk in accordance with embodiments of the present disclosure.

With reference now to FIG. 4, data structures 402-412 will be described for processing a customer action with a kiosk in accordance with embodiments of the present disclosure. In one embodiment, data structures 402-412 comprise at least three fields. The first field—the "A" subelement designations—is a customer action and the customer-determined purpose. The second field—the "B" subelement designations—is a meta-meaning determined by processing equipment associated with the kiosk. The third field—the "C" subelement designations—is associated with a response selected by the retailer to respond to an occurrence of the meta-meaning.

A kiosk responds, in part, to a primary meaning of the customer action. For example, customer action 402A, searching for shoes, would cause kiosk 104 to display shoes, the location of the shoe department, or other response appropriate for such a search. If a customer action was to search for a garbled or gibberish word, the response would be to respond with an appropriate indication that no results were found, the query was not understood, and/or other appropriate response. However, a meta-meaning is processed outside of the primary meaning and, if appropriate, a response is provided that is distinct from the response to the primary meaning of the customer action.

In one embodiment, customer 102 interacts with kiosk 104 resulting in customer action portions 402A, 404A, and 406A. Kiosk 104 then responds to customer action portion 402A, 404A, and 406A accordingly. In the embodiment illustrated, customer action portions 402A, and 404A may be associated as associated "no action" portions 402C, 404C. A third similar action 406A, may be associated with meaning 406B and action 406C whereby an agent is notified to assist customer 102. In another embodiment, meaning 406B and associated action 406C may be dynamically determined. For example, customer actions 402A, 404A, and 406A may occur in an alternative order and the third action results in meaning 406B and action 406C.

The determination that the occurrence of three similar actions warrants a response, such as action 406C, may be a matter of design choice. In certain installations the threshold may be a greater or fewer number of similar customer actions. The threshold of similar user actions may also be determined on a particular type of item that forms the subject of the user actions. For example, a set of customer actions that repeatedly search for low-value items may require a greater number of search instances before an agent is notified, whereas a high-value item may require fewer search instances to warrant agent notification. The threshold may also be dynamically determined based on the current ability of one or more agents available to respond. For example, an eligible agent nearby kiosk 104 may be notified much sooner than a similarly eligible agent who is farther away. The workload of the eligible agents may also be considered such that a degree of urgency of a meaning, for example 406B, does not disturb an agent who is currently assisting another customer and more customers are waiting for the agent to assist them. In contrast, an agent with light workload may be notified sooner, such as upon user meaning 404A having meaning 404B and action 404C then being modified so that an agent who is available, has a light workload, and/or is working a low priority task may be notified.

In another embodiment, customer 102 interacts with kiosk 104 resulting in the performance of actions associated with customer action portions 408A of data structure 408. The associated meaning, 408B, may then be associated with action 408C. For example to notify agents that customer 102 is interested in a high-value item. In other embodiments, the item may be heavy, awkward, fragile, or otherwise warrant special handing. The notified agent may then be prepared to receive customer 102 or meet customer 102. Additionally the agent may be notified of any special handling of the item that is the subject of customer action portion 410A and/or customer 102. For example, the responding agent may be informed that customer 102 warrants personal attention and/or the item customer 102 is interested in warrants special handing, packaging, assistance, documentation, complementary products (e.g., cables, adapters, other items within a related set, etc.) and/or other supporting items.

In another embodiment, customer 102 performs a set of actions 410A through 412n associated with data structures 410-412. It should be noted that the number of data structures represented by data structures 410-412 is two or more, with the upper limited determined as a matter of design choice. For example, data structure 410 may be associated with a first timestamp and data structure 412 associated with a second timestamp. The difference between the first and second timestamps may indicate the user is spending an unusual amount of time at kiosk 104. Therefore, while meaning 410B may not be associated with the notification of an agent, namely action 410C, and customer action 412nA may, if occurring individually, may similarly be associated with not summoning an agent, however, the relationship between customer actions 410A and 412nA may be actionable. In additional to a difference in time, the count of customer actions from customer action 410A-412n may warrant response 412nC whereby an agent is notified to assist the customer.

In still another embodiment, customer actions that indicate confusion and/or difficulty utilizing kiosk 104 may result in an agent being notified. For example, customer 102 may have a motor, language, cognitive, or other impairment that results in searches for items that do not exist or the search term is not understood. Repeating the same action multiple times may also be an indication of confusion or frustration. A search or other action that fails followed by evidence of frustration, such as searching for a profanity, may similarly cause an agent to be notified.

Figure 5:
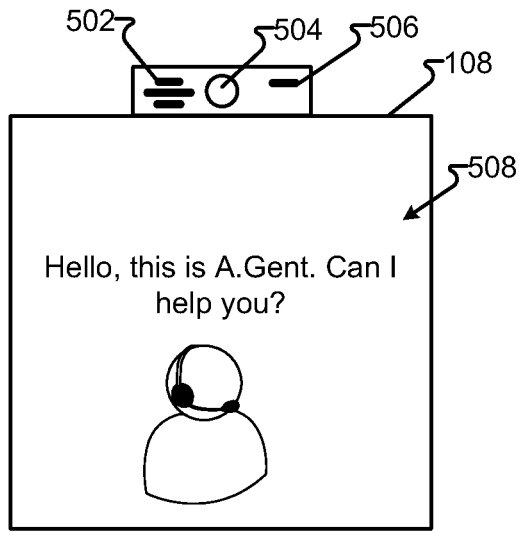
FIG. 5 depicts kiosk components in accordance with embodiments of the present disclosure.

With reference now to FIG. 5, kiosk 104 components will be described in accordance with embodiments of the present disclosure. In one embodiment, kiosk 104 includes display 108, speaker 502, camera 504, and microphone 506. Kiosk 104, and one or more of display 108, speaker 502, camera 504, and microphone 506 may in communication with a remote agent. The remote agent may be located at the retail setting or offsite. A remote agent may utilize equipment, such as one or more of a camera, speaker, microphone, and display.

In one embodiment, upon an action, such as actions 406C, 408C, and or 412nC an agent may be notified. As described more fully above, an on-site agent may be notified to assist the customer. However, the resources of a contact center may be leveraged such as to give control of display 108, speaker 502, camera 504, and/or microphone 506 to a remote agent. The remote agent may further be presented with actions associated with customer 102 to provide the remote agent with context on what caused the remote agent to be notified. The remote agent may then speak, listen, see, be seen, and/or listen via display 108, speaker 502, camera 504, and microphone 506 and assist the customer.

Figure 6:
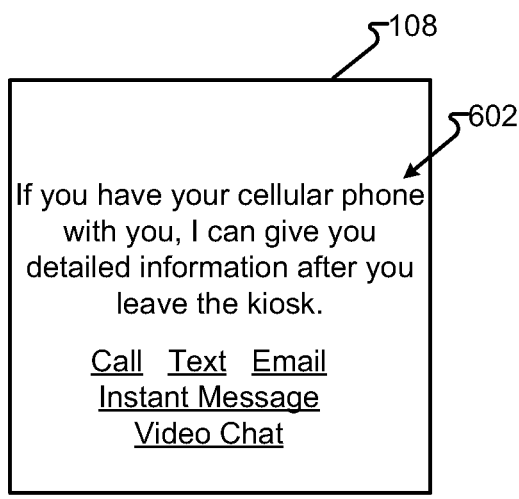
FIG. 6 depicts an interface to initiate communication between a remote agent and a customer in accordance with embodiments of the present disclosure.

With reference now to FIG. 6, display 108 will be described in accordance with embodiments of the present disclosure. As described with respect to FIG. 5, a remote agent may assist a customer via components of kiosk 104. In another embodiment, kiosk 104 and display 108 may provide information to facilitate communication between a remote agent and a device of client 102. A device, such as a smartphone, cellular phone, tablet, or other mobile computing device may be utilized to provide additional assistance. In such a way, at least a portion of the functionality of kiosk 104 may be transferred to a device of customer 102.

In another embodiment, an agent may offer to provide additional assistance to customer 102 via their device. Customer 102 may be presented with display image 602 that offers connectivity via one or more of telephone (i.e., voice only), text, instant message, instant message via social media application, email, one-way or two-way video, or other communication means. Options may also be delivered via the speaker, such as the remote agent speaking instructions to customer 102, or graphically. Graphical options may include text and/or images (e.g., QR codes).

Once connected, the remote agent may provide additional instructions. For example, in a voice-only mode, customer 102 may be instructed to tell the remote agent when they are at the shoe department, the remote agent then delivers instructions to customer 102 as to the next waypoint. In a video mode, customer 102 may be presented with a map, visual waypoints, or other queues. Similarly, the remote agent may be presented with a video feed and respond accordingly (e.g., "I see you are now at the shoe department. Go left past the display of shoe polish."). Text-based communications may be as interactive, however, certain advantages may be provided by delivering more information, such as all instructions to be performed.

In a further embodiment, security camera and/or other sensors within the retail environment may provide assistance to the remote agent. For example, a security camera covering the shoe department may be presented to the remote agent, whereby the remote agent may issue additional instructions (e.g., "Now turn left") and/or monitor the progress of customer 102.

In the foregoing description, for the meanings of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-meaning or special-meaning processor (GPU or CPU) or logic circuits programmed with the instructions to perform the methods (FPGA). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
   operating a kiosk;
   receiving, by a microprocessor of the kiosk, a first customer action from a customer, the first customer action being associated with a first primary meaning determined by the customer and absent a request for agent assistance and wherein the first customer action comprises a first pattern of events;
   determining a first primary response to the first primary meaning;
   performing the first primary response;
   analyzing, by the microprocessor, a set of rules to determine a meta-meaning associated with the first customer action and wherein the meta-meaning is different from the first primary meaning;
   receiving, by a microprocessor of the kiosk, a second customer action from the customer, the second customer action being associated with a second primary meaning determined by the customer and wherein the second customer action comprises a second pattern of events;
   determining a second primary response to the second primary meaning;
   performing the second primary response;
   analyzing, by the microprocessor, the set of rules to further determine the meta-meaning associated with a relationship between the first customer action and the second customer action;
   determining, by the microprocessor, a first secondary response based on the meta-meaning;
   upon determining the first secondary response is to provide agent assistance to the customer, selecting an agent from a set of agents to assist the customer; and
   signaling a device associated with the selected agent, wherein the signal comprises information obtained by the kiosk to assist the customer and, in response to receiving the signal at the device, the device prompts the selected agent to assist the customer.

2. The method of claim 1, wherein the relationship is a degree of similarity between the first primary meaning of the first customer action and the second primary meaning of the second customer action.

3. The method of claim 1, wherein the relationship is the time between the first customer action and the second customer action.

4. The method of claim 1, wherein the set of rules includes at least one rule evaluating at an attribute associated with the customer.

5. The method of claim 1, wherein the set of rules includes at least one rule evaluating at least one of weight, size, awkwardness, fragility, and value of an item identified in the first customer action.

6. The method of claim 5, wherein the step of signaling the selected agent further comprising signaling the selected agent and including with the signal, indicia of the item identified in the first customer action.

7. The method of claim 1, further comprising:
   taking a picture of the customer; and
   the step of signaling the selected agent further comprises signaling the selected agent with the picture.

8. The method of claim 1, wherein the selected agent is a remote agent operable to utilize the kiosk to communication with the customer.

9. The method of claim 8, further comprising:
   presenting, by the kiosk, instructions to the customer for interacting with the remote agent via a communication device of the customer; and
   upon the customer executing the instructions, connecting the remote agent to the customer via the communication device.

10. The method of claim 1, wherein the first secondary response comprises providing special handing for an item associated with the first customer action.

11. The method of claim 1, wherein the first secondary response comprises providing special handing for an item associated with the second customer action.

12. The method of claim 1, wherein the first secondary response comprises providing a related article associated with an item identified in the first primary response.

13. A system, comprising:
a kiosk, further comprising,
a display,
an input, and
an output; and
a processor, operable to:
receive a first customer action from a customer, the first customer action being associated with a first primary meaning determined by the customer and absent a request for agent assistance and wherein the first customer action comprises a first pattern of events;
determine a first primary response to the first primary meaning;
perform the first primary response;
analyze a set of rules to determine a meta-meaning associated with the first customer action and wherein the meta-meaning is different from the first primary meaning;
receive a second customer action from the customer, the second customer action being associated with a second primary meaning determined by the customer and wherein the second customer action comprises a second pattern of events;
determine a second primary response to the first primary meaning;
perform the second primary response;
analyze the set of rules to further determine the meta-meaning associated with a relationship between the first customer action and the second customer action;
determine a first secondary response based on the meta-meaning;
upon determining the first secondary response is to provide agent assistance to the customer, select an agent from a set of agents to assist the customer; and
signal a device associated with the selected agent, wherein the signal comprises information obtained by the kiosk to assist the customer and, in response to receiving the signal at the device, the device prompts the selected agent to assist the customer.

14. The system of claim 13, wherein the relationship is a degree of similarity between the first primary meaning of the first customer action and the second primary meaning of the second customer action.

15. The system of claim 13, wherein the relationship is the time between the first customer action and the second customer action.

16. The system of claim 13, further comprising:
a remote terminal operable by a remote agent;
a network interface operable to enable communication between the kiosk and the remote terminal; and
wherein the processor is further operable to signal the remote agent to assist the customer and the facilitate communication connectivity of the remote agent to the input and the output via the network interface.

17. A system comprising:
means for operating a kiosk;
means for receiving, by a microprocessor of the kiosk, a first customer action from a customer, the first customer action being associated with a first primary meaning determined by the customer and absent a request for agent assistance and wherein the first customer action comprises a first pattern of events;
means for determining a first primary response to the first primary meaning;
means for performing the first primary response;
means for analyzing, by the microprocessor, a set of rules to determine a meta-meaning associated with the first customer action and wherein the meta-meaning is different from the first primary meaning;
means for receiving, by a microprocessor of the kiosk, a second customer action from the customer, the second customer action being associated with a second primary meaning determined by the customer and wherein the second customer action comprises a second pattern of events;
means for determining a second primary response to the second primary meaning;
means for performing the second primary response;
means for analyzing, by the microprocessor, the set of rules to further determine the meta-meaning associated with a relationship between the first customer action and the second customer action;
means for determining, by the microprocessor, a first secondary response based on the meta-meaning;
means for, upon determining that the first secondary response is to provide agent assistance to the customer, selecting an agent from a set of agents to assist the customer; and
means for signaling a device associated with the selected agent, wherein the signal comprises information obtained by the kiosk to assist the customer and, in response to receiving the signal at the device, the device prompts the selected agent to assist the customer.

18. The system of claim 17, wherein the relationship is a degree of similarity between the first primary meaning of the first customer action and the second primary meaning of the second customer action.

19. The system of claim 17, wherein the relationship is the time between the first customer action and the second customer action.

20. The system of claim 17, wherein the set of rules includes at least one rule evaluating at an attribute associated with the customer.

* * * * *